DIGITAL-ANALOG OPTICAL CHARACTER RECOGNITION

Filed June 7, 1965 6 Sheets-Sheet 1

April 28, 1970 A. H. BIESER ET AL 3,509,533

DIGITAL-ANALOG OPTICAL CHARACTER RECOGNITION

Filed June 7, 1965 6 Sheets-Sheet 2

April 28, 1970 A. H. BIESER ET AL 3,509,533

DIGITAL-ANALOG OPTICAL CHARACTER RECOGNITION

Filed June 7, 1965 6 Sheets-Sheet 3

DIGITAL-ANALOG OPTICAL CHARACTER RECOGNITION

Filed June 7, 1965 6 Sheets-Sheet 4

DIGITAL-ANALOG OPTICAL CHARACTER RECOGNITION

United States Patent Office 3,509,533

Patented Apr. 28, 1970

3,509,533

DIGITAL-ANALOG OPTICAL CHARACTER RECOGNITION

Albert H. Bieser, Garland, and Leonard J. Nunley and Israel Sheinberg, Dallas, Tex., assignors to Recognition Equipment, Incorporated, a corporation of Delaware Filed June 7, 1965, Ser. No. 461,720
Int. Cl. G06k 9/12
U.S. Cl. 340—146.3 12 Claims

ABSTRACT OF THE DISCLOSURE

A character recognition system wherein the images of successive characters are projected from printed material onto a retina made up of a two-dimensional array of photocells. Output signals from each of the photocells over the entire height of the retina are continuously analyzed to produce a center signal representative of the center of any given image on the retina. The recognition process for each of the successive characters, as they move across the face of the retina, includes the production of image orientation information for connecting a plurality of conditioning channels, in number less than the photocells of said retina, to a mosaic of cells symmetrical to the image center.

This invention relates to character recognition and, more particularly, to the production and utilization of character dependent signals which involve information having both analog and digital qualities.

In a further aspect, the invention relates to sensing and following variations in registration between character images and a retina, in direction perpendicular to travel of character images across the retina.

The need exists for reliable and rapid automatic reading of documents imprinted with alphabetic characters and numerals. Various systems are known for scanning printed documents to obtain a signal having an amplitude versus time variation dependent upon the entire character. Such systems use a single shot comparison of the entire character. Systems of a different nature are also known wherein a multicell retina is employed, together with a suitable logic system connected to the retina to identify images successively projected onto the retina. The present invention relates to systems of the latter type. The prior art systems of the latter type, in general, are characterized by the production of character identifying signals which are digital or analog in nature. The present invention takes advantage of the possibilities of a multicell retina and, in addition, has provision for utilization of analog information in signals from each of the cells in a retina, as well as digital information.

In accordance with one aspect of the invention, the individual responses of the elements of a retina are examined. A comparison is made between each such response and the responses from selected adjacent areas so that a determination is made as to whether or not each area is darker or lighter than the adjacent areas. If the signal from a given cell indicates an area which is darker than adjacent areas, and if such area for a given character is supposed to be black, then analog information in the signal is discarded and a signal is utilized which is essentially digital in nature, in that it is at a reference value. If the signal from a cell indicates an area which is darker than surrounding areas and, for a given character, it is supposed to be white, then the analog character of the signal is retained.

Thus, in the present invention, advantages of both the analog and the digital systems are employed to enhance character recognition and to simulate, as nearly as possible, the actual operations which take place in the human eye in reaching a decision as to the identity of any given character relative to its background.

More particularly, the identification of characters by machine is accomplished where the characters each appear on a contrasting background. A multicell retina is employed to examine individual areas of a character and its background to provide outputs corresponding to the optical density of each area. Criteria means are provided for each of the characters to be identified. Each criteria means includes components which correspond to first areas which an examined character is expected to occupy, and second areas which an examined character background is expected to occupy. A comparison is made between each area and the immediately surrounding areas and criterion input signals are then generated. If an area is found to be of expected optical density relative to its background, an input signal of reference level is employed in the criteria means. If an output signal represents an unexpected density compared with its surrounding area, then an input signal is applied to the criterion which retains all of the analog character. Means operatively connected to the criteria means are provided for comparing all of the criterion output signals for the detection of the time occurrence of a single output signal which satisfies matching requirements within predetermined limits.

Further, in accordance with the invention, a retina is provided with height much greater than the height of any character expected. Retina output signals from over the entire height of the retina are continuously analyzed to produce an output signal representative of the center of any given image on the retina. Switching means are provided responsive to such output signals for centering a set of decision channels on each such character.

For a more complete understanding of the present invention and for further objects and advantages thereof, reference may now be had to the following description taken in conjunction with the accompanying drawings in which.

Figures 1, 5:
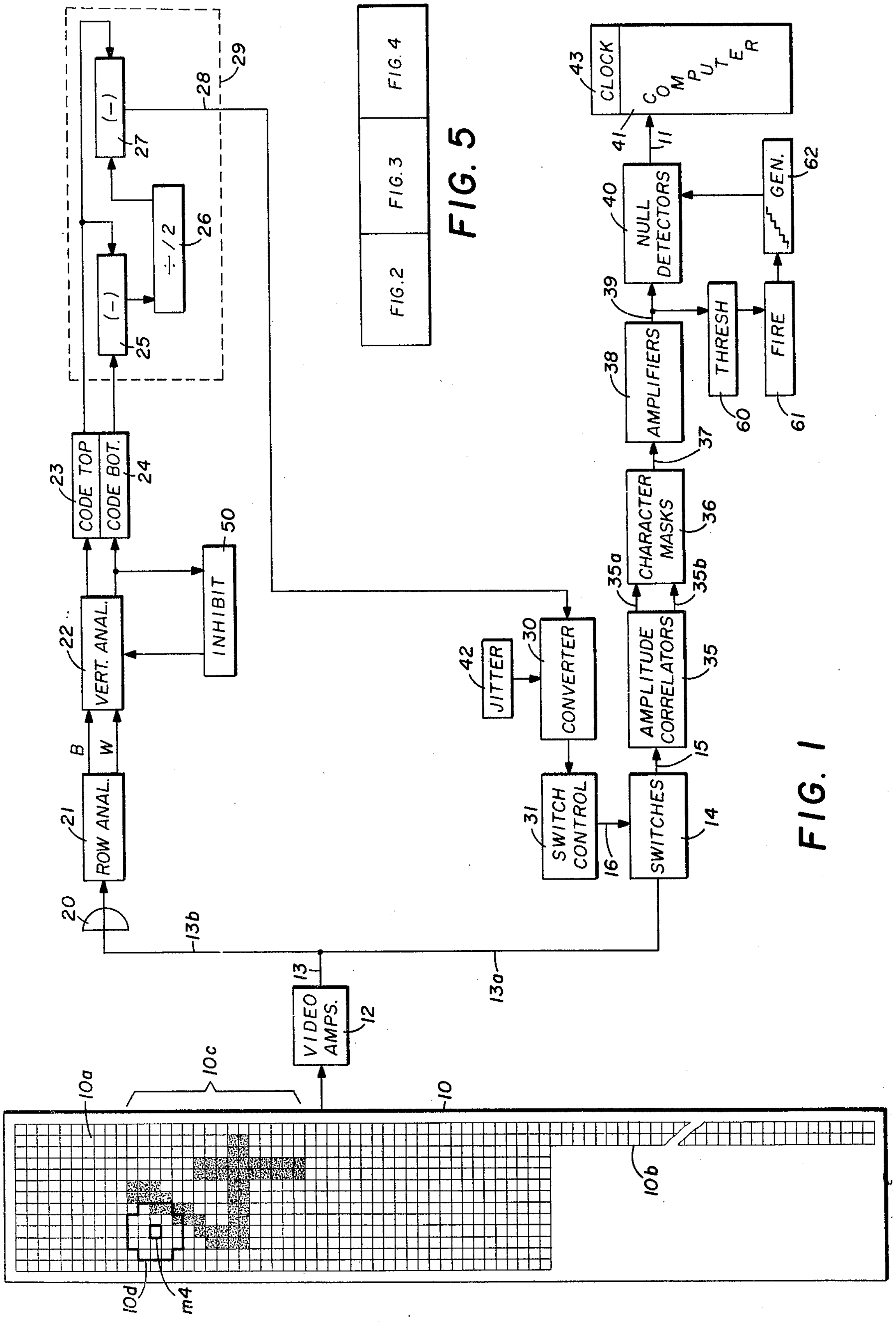
FIGURE 1 is a block diagram illustrating an optical character recognition system embodying the present invention.
FIGURE 5 illustrates the physical relationship between FIGURES 2–4.
Figures 6, 7, 9:
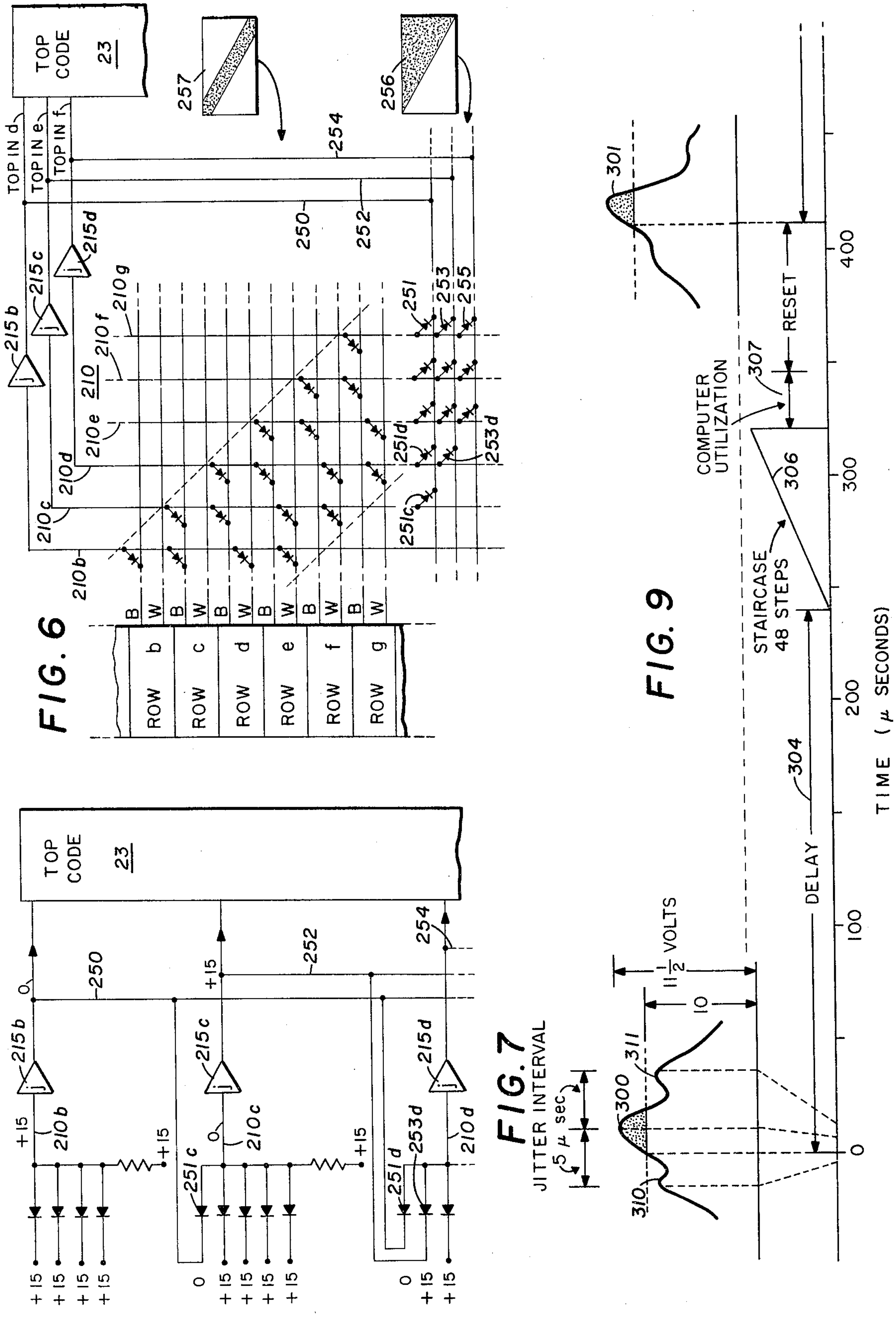
Figure 8:
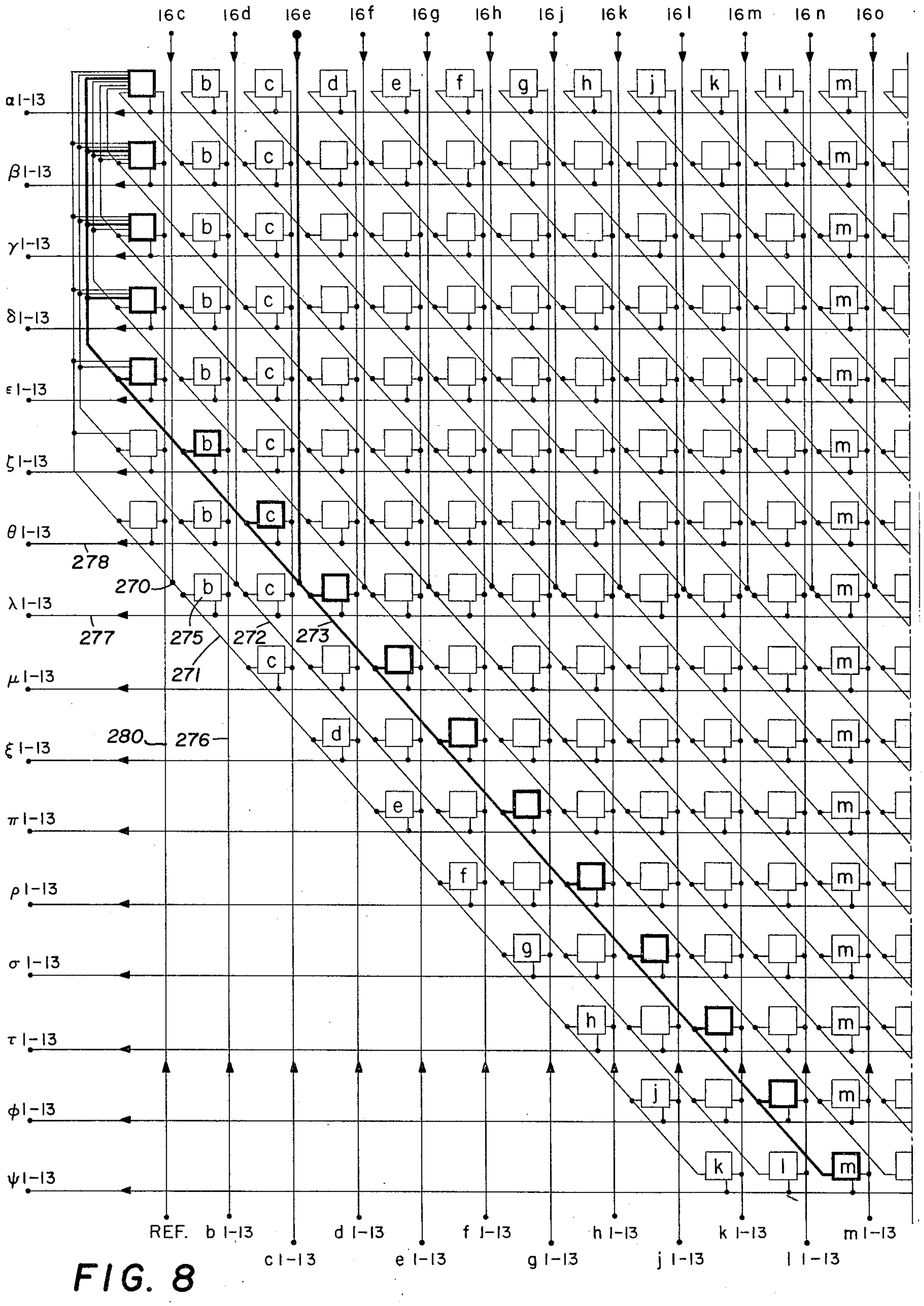

FIGURE 6 diagrammatically illustrates operation of the vertical analyzer of FIGURE 1;

FIGURE 7 is a circuit diagram illustrating construction employed in the system of FIGURE 6;

FIGURE 8 illustrates the switches of FIGURE 1; and

FIGURE 9 illustrates signals involved in the operation of the invention.

GENERAL DESCRIPTION

FIGURE 1 illustrates a character recognition unit in block form wherein the images of successive characters are projected from printed material onto a retina 10 made up of a two-dimensional array of photocells. The recognition process for each of the successive characters, as they move across the face of the retina, has as an object the production of character indicating signals on one of a plurality of output channels 11 and at a time when there is not a like signal on any other output channel. When this is the case, each output signal will be singularly indicative of registration of a character with the retina 10.

In FIGURE 1, the retina 10 is comprised of an array of photocells, each of which permits current flow therethrough from a source (not shown) which is dependent upon the amount of light thereon. In the form illustrated, the retina 10 comprises an upper array 10*a* of thirteen columns and forty-eight rows or a total of six hundred and twenty-four cells. A two-column line finder array 10*b* extends below array 10*a* at the right margin thereof. By means of suitable optics and document handling equipment, character images are projected onto the retina 10, moving from right to left as viewed in FIGURE 1.

A bank of video amplifiers 12 is connected to the output of the retina. One such amplifier is provided for each cell. Output channels 13, leading from the bank of video amplifiers 12, extend to a switching unit 14.

The array 10*a* in retina 10 is of greater height than any given character employed in the system. The extended height is employed in order to accommodate vertical variations in registration between successive images and the retina array 10*a*. In this system the tallest image of any character projected onto the retina array 10*a* arbitrarily is set to be sixteen cells in height. The system beyond the switching unit 14 thus may have a far more limited number of channels than in the amplifier bank 12. More specifically, only two hundred and eight output channels 15 extend from the switching unit 14. This corresponds with the mosaic 10*c* in array 10*a* which is sixteen cells high and thirteen cells wide. The switching unit 14 is controlled by way of channels 16. Switching is controlled such that at any given time, the channels 15 will be connected to that fraction of the channels 13 leading from mosaic 10*c* on which a given character is centered. The switches 14 are to be dynamically energized as to be capable of change during transit of a given image across the retina.

The switching control functions are produced on channels 16 in response to the operation of a vertical analyzer system which includes a bank of OR gates, one of which, the OR gate 20, is shown in FIGURE 1. An OR gate is provided for each of the forty-eight rows of cells in the retina 10. For simplicity, only one channel of the vertical analyzer has been illustrated in FIGURE 1. Each such OR gate provides an input signal to a row analyzer 21 which in turn drives a vertical analyzer 22 which in turn feeds a character top unit 23 and a character bottom unit 24. Units 23 and 24 then serve to apply coded output signals to a subtraction unit 25.

The output of the unit 23 is thus coded to identify the row of cells on which the top of a given character is registered. The subtraction unit 25 produces a coded output which represents the height of the character. A division operation is carried out in unit 26. The coded output of unit 26 is proportional to one-half the height of the character registered with the array 10*a*. The coded output from unit 23, indicating the location of the top of the character, is also applied to a subtraction unit 27. The signal from unit 26 is subtracted from the character top signal to provide a signal on output line 28 which indicates the row of cells corresponding with the center of the character. This signal is then applied to a code converter unit 30. The signal output from converter unit 30 is then applied to the switch control unit 31 selectively to actuate the channels 16. This serves to close switches in channels leading from the cells in the mosaic 10*c* to the channels 15. Channels 15 thus are connected only to channels 13 leading from cells in the mosaic 10*c*.

Channels 15 extend from the switching unit 14 to amplitude correlation units 35 where each output is correlated with the average of the output signals from cells in the area immediately around a given cell. There is one amplitude correlator for each of the two hundred and eight cells in the mosaic 10*c*. Each amplitude correlator produces two output voltages, one digital and one analog. Comparison is made for each cell with surrounding cells. For example, in the correlator for cell *m*4, the output of cell *m*4 is compared with a summation signal representing the average of the output signals from the twenty cells in the threshold area 10*d* indicated by a dark outline.

Each of the amplitude correlator units 35 thus applies two output signals to each of a plurality of pairs of character masks represented by the unit 36. Character masks will be provided in pairs equal in number to the total number of different characters to be identified. The output channels 37, from the character mask units 36, extend to a bank 38 of controlled amplifiers which produces signals on channels 39 for application to a bank 40 of detectors. The channels 11 extending from the detectors 40 may then be connected to suitable storage devices or computing systems which will be responsive to successive signals on the output channels 11.

The output signals on channels 11 may be employed in various ways. The most general use involves accounting procedures based upon numerical data obtained from successive documents scanned by retina 10. Such procedures are carried out by units such as a general purpose or special purpose computer 41.

Registration between images of characters on successive lines on a given document and the retina 10 may be accomplished by known documents handling systems. Such systems form no part of the present invention. However, it is to be recognized that mechanical positioning of a printed page cannot readily be controlled to the precision necessary to bring each line into exact registration with a retina whose height corresponds only to the height of the projected image. In the present system, use of a tall retina 10 and the information supplied by way of channels 13*b* and the OR gates 20 produce the equivalent of a system in which precise registration is achieved with a retina of height which is equal to image height. Further, with a tall retina, if a given line is skewed, the switch control unit 31 will shift connections between channels 13 and 15 for successive images moving across the retina 10 so that each character brought into registration with the retina 10 may be accurately identified. Still further the switches 14 will be altered during registration of each character to sense partial registration of a character top or bottom with a given row of cells.

If single-spaced material is being scanned by the retina, two images, one located below the other, may be in registration with the array 10*a* at the same time. The code on line 28 is correlated, as will be described, so that only the top mosaic for two or more images on the retina 10 will be coupled through switches 14 to the decision portion of the system.

Further, the top of a given image sixteen cells high may fall along the center of a row of cells. The bottom of such images would cover only the upper half of the cells in a row located seventeen rows below the top of the image. Thus, the exact registration, illustrated between mosaic 10*c* and the character 4 shown in FIGURE 1, would be an unusual occurrence. For this reason, a unit 42 provides a jitter voltage which is applied to the converter 30. By this means, for every position of a character brought into registration with the array 10*a*, a signal appears from a pair of character masks which will have three components spaced in time in dependence upon operation of unit 42. The first such component may represent the output signals based upon setting of the switches 14 for the computed image center location, i.e., for the code on line 28. Immediately thereafter, the switches 14 are altered by operation of unit 42 so that the mosaic 10*c* is stepped up one row of cells from the computed center row to produce the second component. Thereafter the mosaic is stepped down to one row below the computed center row so that a third component will be produced. By this means it will be assured that one of the three components will be the maximum signal that can be produced from a given character for any image position on the retina.

While the foregoing description is of general character, the system will be understood to identify, at high speeds, characters corresponding with images which laterally sweep across the retina 10. It will be understood that timing in the system will be controlled primarily by a signal from a clock unit 43. In this embodiment, the system operates to accommodate a document velocity past the retina of two hundred inches per second. For character spacing on the printed document of 0.083 inch, center to center, a new image will be brought into registration with the retina 10 every four hundred and fifteen microseconds. Thus, the characters would move across the retina 10 at the rate of twenty-four hundred characters per second.

The system and its operation may be briefly characterized as follows:

(1) The retina 10 is several times higher than the height of the image of the tallest character to be analyzed.

(2) A separate channel leads from each retina cell through video amplifiers to the switches 14.

(3) The video amplifiers 12 are each gain controlled to provide output signals on channels 13, which vary over the same range when changing from registration with the blackest of the portions of a given character image to the background on which the character is printed. This effect is produced even though the background area may vary, from page to page or location to location, from white to various shades of gray.

(4) The center location of each character brought into registration with the retina 10 is centered by switches 14 on output channels 15.

(5) The amplitude correlators 35 each compare the output from one cell in the mosaic 10*c* with the average of selected surrounding cells, and produce two outputs, as on channels 35*a* and channels 35*b*, one of which is essentially a reference signal and the other of which is essentially of analog character.

(6) Two character masks are provided for each character to be identified.

(7) One detector is provided for each pair of character masks and produces a character-presence signal any time the image on the retina is in sufficiently close registration to produce a mask output signal above a threshold level. A stairstep voltage is compared with the mask output signals which are above the threshold level. The highest mask output signal produces a first character-presence signal. If a selected number of additional steps fails to produce a second character-presence signal from any other mask output signal, then the character identification is finalized and a single character-presence signal on one of the channels 11 leading to the computer 41 is accepted and utilized.

Figure 2:
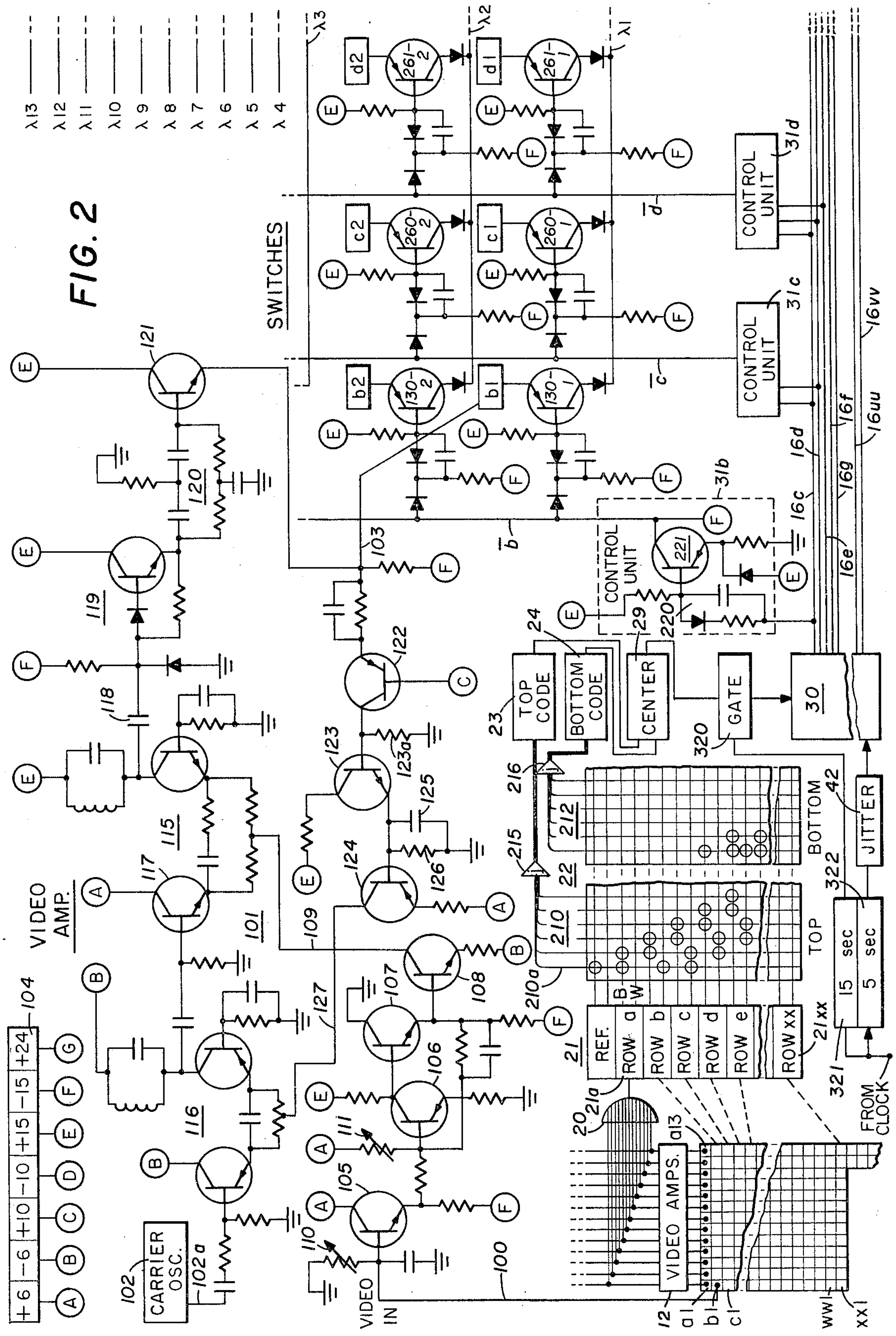
FIGURE 2 is a fragmentary view of the retina of FIGURE 1 together with a schematic diagram of a video amplifier and a portion of a switching matrix.
Figure 3:
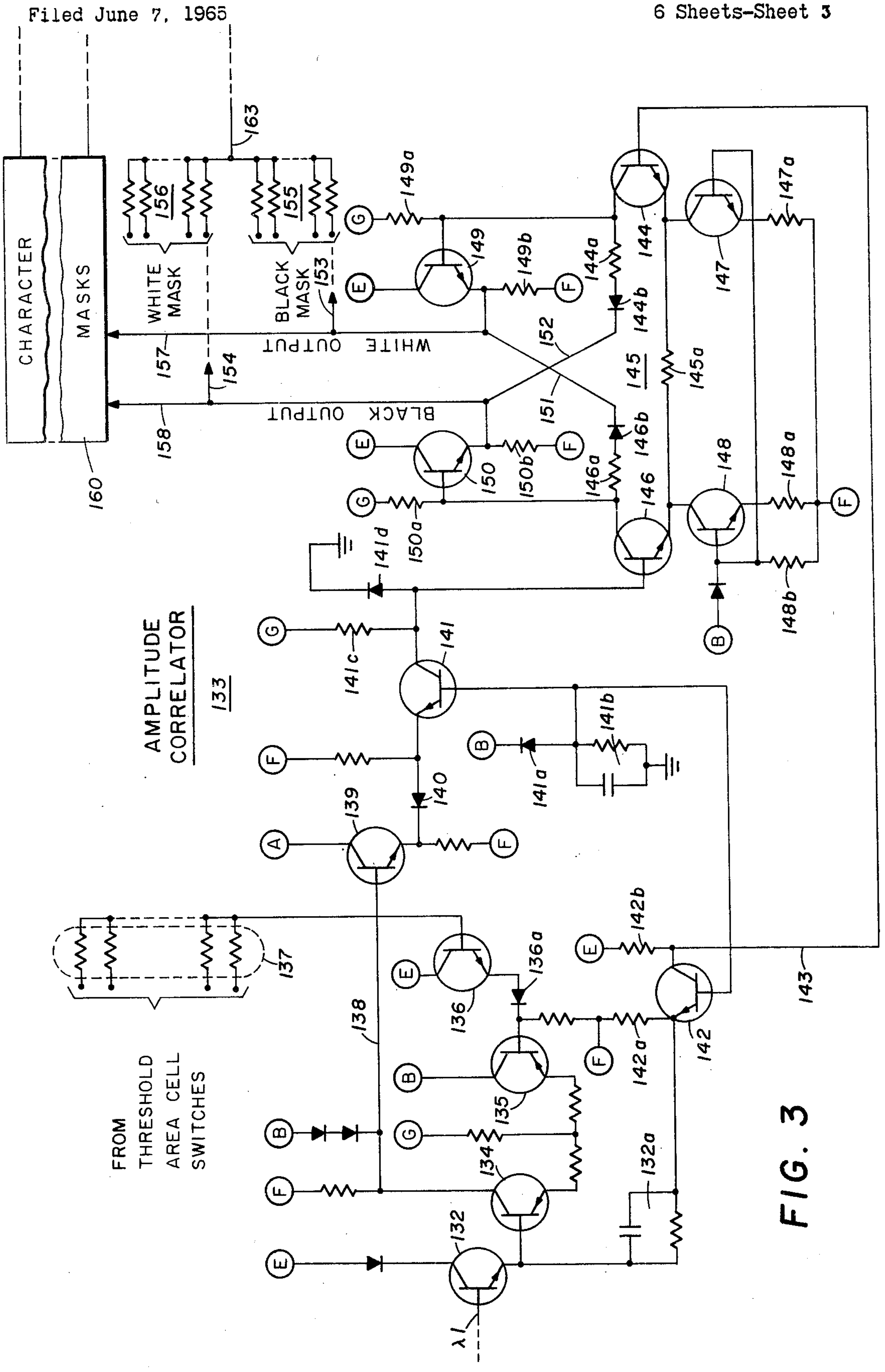
FIGURE 3 illustrates an amplitude correlator channel with character masks.
Figure 4:
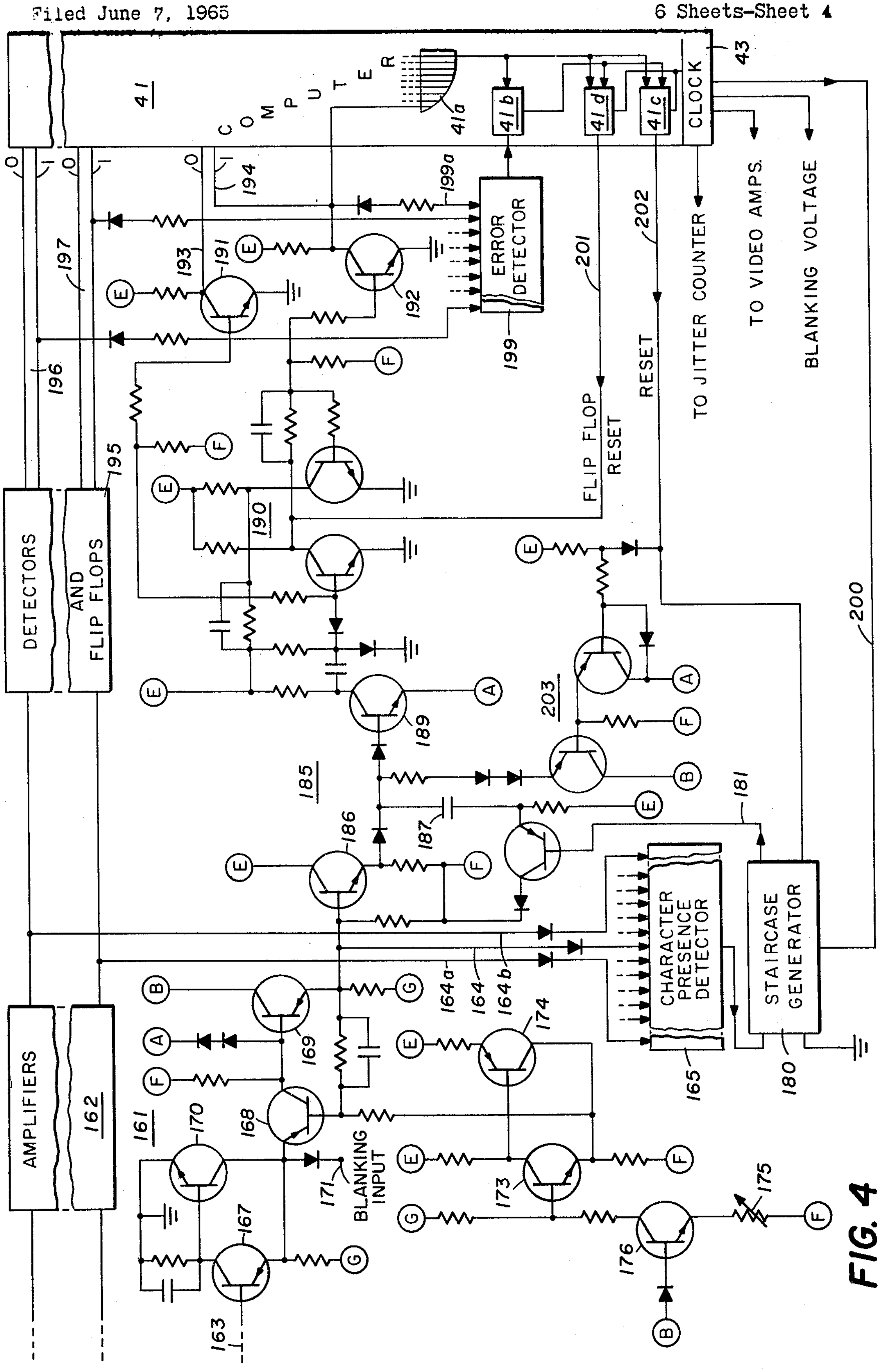
FIGURE 4 illustrates a schematic diagram of an amplifier, detector and decision generator.

With the foregoing general description of the system in mind, there will now be presented a description primarily relating to a single channel, shown in FIGURES 2–4, extending from the retina 10 to the computer 41. Thereafter, the relationship of that channel to the remaining channels leading to the switching units, and to the channels dealing primarily with decision making, will be explained along with the interconnecting controls for all of the channels.

Video amplifier

Referring now to FIGURE 2, a portion of the retina 10 has been illustrated with a bank of video amplifiers 12 connected to all the cells in the top row of the retina 10. Each of the cells in all other rows *b–xx* similarly are connected to video amplifiers (not shown). For example, cell *b*1 is connected by way of channel 100 to the input of a video amplifier 101.

The video amplifier 101 is provided with a second input channel 102*a* to which a 600 kc. carrier is applied from an oscillator 102. The video amplifier 101 is gain controlled to provide an output signal on the output channel 103 which will be of analog character and will vary from a predetermined minimum voltage to a predetermined maximum voltage when the cell *b*1 changes from registration with a black image to a background area. The amplifier 101 is controlled so that the output voltage representing the intensity of the background will be substantially constant even though there are changes in the optical density of the background surrounding any given image. The gain is changed automatically so that the analog voltage representing the image information presented to the photocell will be referenced to this constant background level, even though the background and image optical densities change substantially as successive images move across the retina 10. A constant reference permits use of analog information as a part of the basis for making an ultimate decision as to the identity of a given character image in registration with the retina 10 at any one time.

For convenience, supply voltages have been indicated by the legends A–G to represent various supply voltage levels as derived from a suitable supply voltage source 104. It will be understood that all terminals having a like label are connected to a voltage source of the magnitude and polarity indicated in unit 104.

The signal from cell *b*1 is applied by way of channel 100 to the base of a transistor 105. Transistors 106, 107, and 108 serve to amplify the signal from the cell *b*1 to supply a modulation signal on the line 109.

A variable resistor 110 is connected in series with the cell *b*1 to adjust the output signal applied to the base of transistor 105. This resistor is initially adjusted to accommodate the variations in the sensitivity of the different cells. This permits a given retina system to be optimized even though the individual photocells employed in the retina may have sensitivities which are not uniform.

A second variable resistor 111 is connected between the base of transistor 106 and the supply terminal A. Resistor 111 is adjusted in order to set the reference output level on line 109 for a black background on cell *b*1. Adjustment of resistor 111 sets the bias on the feedback amplifier 106, 107. The bias point is adjusted so that an output signal from the video amplifier of −1 volt will correspond with a black image on cell *b*1. The signal from the feedback amplifier 106, 107 is applied by way of line 109 to an amplitude modulator 115.

A carrier signal from carrier oscillator 102 passes through a gain control modulator 116 whose output is applied to the base of the input transistor 117 of a signal-controlled modulator 115 which is controlled by the modulation signal on line 109. The signal-modulated carrier is then applied by way of condenser 118 to a detector section 119. The output from the detector 119 is applied to a filter section 120 which drives an output transistor 121. The output channel 103 is connected to the emitter of output transistor 121.

An automatic gain control feedback path including the transistors 122, 123, and 124 is connected between the output channel 103 and the gain control modulator 116. The time constant of the gain control path is asymmetric in the sense that the gain of the amplifier can be abruptly decreased at a very high rate, whereas it will be caused to increase at a substantially lower rate. That is, a charge may be placed on condenser 125 rapidly by feeding condenser 125 from transistor 123. However, the charge cannot leak off from the condenser 125 except by way of resistor 126. The time constant of the circuit 125–126 thus controls the rate at which the gain of the amplifier may increase. The output of transistor 124 is coupled by way of conductor 127 to the gain control input of the modulator 116.

The video amplifier 101 is thus controlled so that the background around a given sequence of characters viewed by the cell *b*1 will initially determine the gain of the video amplifier connected to cell *b*1. This is accomplished by adjusting the potential on condenser 125 to such a level that the maximum output voltage on channel 103 will be the same regardless of such background. More particularly, the gain of the amplifier 116 is directly proportional to the amount of current through transistor 124, just as the gain of amplifier 115 is directly proportional to the current through transistor 108. With no light falling on the photocell, transistor 108 is cut off completely, reducing the gain of amplifier 115 to zero. In this case, there will be no output regardless of any input to transistor 117 from amplifier 116. Under these conditions, and for the circuit shown, the output on line 103 is at —1 volt, causing transistor 122 to be reverse biased and thus turned off. With transistor 122 off, transistor 123 will draw very little current since its base is referenced to ground through resistor 123*a*. Condenser 125 has a very slight positive charge due to the base emitter current of transistor 124, which conducts heavily causing the gain of amplifier 116 to be maximum. Hence, the video amplifier is in the maximum gain state just prior to the start of a scan operation by the retina.

When the edge of a document appears, the output on line 103 will rapidly rise toward an extremely high potential due to the high gain setting of the video amplifier. The instant the output on line 103 exceeds +10 volts, transistor 122 turns on, charging condenser 125 through transistor 123, raising the potential on the base of transistor 124 and reducing the current flow through transistor 124. This reduces the gain of amplifier 116 and thereby the overall video amplifier gain. When the amplifier 116 gain is reduced to the point where output 103 drops to +10 volts, transistor 122 turns off, preventing further reduction in gain.

The time constant of elements 125 and 126 allows a relatively slow gain increase such that the control transistor 122 can reset the amplifier gain if the photocell has a maximum white input. Hence, anytime the photocell is presented an input whiter than the background to which the video amplifier was previously automatically adjusted, the amplifier automatically will reduce its gain, readjusting for the new background level and maintaining a constant background voltage of +10 volts. If the gain were initially set on a smudge at a document edge, the first time white appeared, the gain would be readjusted. If the entire page were gray, only slight adjustments would be made to maintain the constant background level.

Between gain settings, the output 103 will be an analog value directly proportional to the shade of gray or black representing the character image area in registration with the photocell. An extremely dark image area would result in an output of —1 volt, while a half-dark or gray image area would provide an output of approximately +5 volts. Again, the time constant of elements 125 and 126 prevents the video amplifier from attempting to compensate for the rapidly changing image information appearing on the photocell.

The gain control operates to permit abrupt reduction in the amplifier gain so that the output signal will not exceed 10 volts, regardless of background. It permits the gain to increase at a relatively slow rate to accommodate gradations from white to gray in the background.

Video amplifier control of the foregoing character has been found to be highly significant in character recognition. The level of each video output signal is automatically controlled so that it will vary over the same range (from —1 volt to 10 volts) even though the background varies from pure white to various dark shades of gray. With the video output voltage thus controlled, the recognition of different characters may then be made to depend upon the absolute values of the video output signals, thus permitting use of analog information as well as digital information.

Amplitude correlator

Video amplifier output channel 103 is connected to the *b*1 input terminal of a switch unit 130–1. Similarly, the other output channels are connected to companion switches at switch input terminals *b*2–*b*13 with only switch terminals *b*1 and *b*2 being shown in FIGURE 2. Operation and control of the switches will be described in detail hereinafter. For the present, it will be sufficient to note that when the switch 130–1 is actuated, the signal on channel 103 is applied to the output line λ1.

Line λ1 extends to the input transistor 132 of an amplitude correlator 133, FIGURE 3. The amplitude correlator essentially performs two functions. The first function is to compare the output from the cell *b*1 with the output of a selected group of surrounding cells so that a positive determination can be made as to whether or not the signal from cell *b*1 should be labeled as a black signal or as a white signal. The signals will be so identified, the black signal corresponding with the output from the cell *b*1 when it views a field darker than the average of the surrounding cells. The white signal will represent the output from the cell *b*1 when the cell *b*1 views an area which is lighter than the average signals from surrounding cells.

The second function is to provide two output signals based upon the output from each cell. One of the output signals will be at a reference level and the other of the output signals will be a signal which retains analog information and is dependent upon the actual amplitude of the cell output.

In the correlator circuit, transistors 132, 134, 135, and 136 form a first differential amplifier. The output signal from the cell *b*1 is applied to the base of the input transistor 132. A summation signal, representing the average of a selected number of cells surrounding the cell *b*1, is applied to the base of transistor 136. The adding network 137 has been schematically shown, indicating that input connections thereto extend from the threshold area cell switches. Each correlator will be connected at one input to receive one video output signal and will be connected at a second input, through such an adding network, for comparison with selected surrounding cells.

In order further to understand the comparison carried out in the differential amplifier 132–136, reference should be had to FIGURE 1. Assume that cell *m*4 is the cell whose output appears on line λ1 and is applied to the base of transistor 132. Signals from all the remaining cells within the outline 10*d* would then be applied by way of the adding network 137 to the base of transistor 136. The signal on the base of transistor 136 represents the average of the outputs from all of the cells within the outline 10*d* except the signal from the cell *m*4. By this means, a reliable indication is produced as to whether or not the area scanned by cell *m*4 is darker or lighter than its surrounding area, and thus the label "black" or "white" may be ascribed to the signal therefrom.

Where the cell under consideration has a location either near the side or near the top of the retina, there may not be a full complement of surrounding cells with which to make the comparison. In this case, substitution is made for the voltages from cells which are missing by applying voltages to the adding network, which voltages are preferably set to represent an area of almost white background. Alternatively, the missing cells could be ignored.

The output conductor 138 from the differential amplifier leads to the base of a pulse-shaper transistor 139. The emitter of the transistor 139 is connected by way of diode 140 to the emitter of transistor 141. The base of transistor 141 is biased by way of diode 141*a* leading to a —6 volt supply terminal. The base is connected to ground by way of R.C. network 141*b*. The collector of transistor 141 is connected to +24 volts by way of resistor 141*c* and to ground by way of diode 141*d*. When transistor 141 is nonconducting, the collector would tend to rise to +24 volts. However, it is held at substantially ground potential by diode 141*d*. When transistor 141 is rendered conductive, the minimum output level of the collector will be at the —6 volt level, controlled by the base bias by way of diode 141*a*.

The collector of transistor 141 is connected to the base of a transistor 146 which forms one input of a differential amplifier 145. Thus, the voltage on the base of transistor 146 will be held at ground potential when the threshold area signal on the base of transistor 136 exceeds the cell output signal on the base of transistor 132. The base of transistor 146 will be held at −6 volts when the threshold area signal on the base of transistor 136 is less than the cell signal on transistor 131.

The emitter of transistor 132 is connected by way of an R.C. network 132$a$ to the emitter of transistor 142. The base of transistor 142 is biased the same as the base of transistor 141. The circuit parameters will be such that the voltage appearing on the output line 143 always will be equal to 10 volts minus the voltage on the base of transistor 132 times 0.6, i.e., $[-(10-e_{132})\times.6]$. The resistors 142$a$ and 142$b$ are so chosen that the aforementioned relationship will always represent the relationship between the voltage on lines λ and 143. The particular relationship is employed for proper operation of the differential amplifier circuit 145 for the particular parameter employed therein. Thus, the above relationship is employed in a circuit for carrying out the comparison function, which circuit will operate at proper voltage levels for the differential amplifier 145. It will be understood that a different relationship may be required for a differential amplifier which is to produce output voltages of levels different than those chosen in the circuit here used for example.

It will be noted that the line 143 is connected to the base of transistor 144. The voltage on the base of transistor 144 will thus be an analog voltage dependent upon the amplitude of the voltage on transistor 132. The differential amplifier 145 has a common emitter resistor 145$a$. The emitter of transistor 144 is connected in series with a transistor 147 whose emitter is connected by way of resistor 147$a$ to a −15 volt supply terminal. The base of transistor 147 is connected to the base of transistor 148, and, by way of resistor 148$b$, to a −15 volt supply terminal. Transistor 148 is connected in series with the emitter of transistor 146. Transistor 144 is connected at its collector to the base of an output transistor 149 and, by way of resistor 149$a$, to a +24 volt supply terminal. The collector of transistor 146 is connected to the base of an output transistor 150 and, by way of resistor 150$a$, to a +24 volt supply terminal. The collector of transistor 144 is connected by way of resistor 144$a$ and diode 144$b$ to the emitter of transistor 150. Similarly, the collector of transistor 146 is connected by way of resistor 146$a$ and diode 146$b$ to the emitter of transistor 149.

The emitter of transistor 149 is connected to line 157, which is the white output line for amplitude correlator 133. Similarly, the emitter of transistor 150 is connected to line 158, which is the black output line for correlator 133.

The differential amplifier 145 operates in dependence upon the signals applied to the bases of transistors 144 and 146 to supply an output voltage on line 157 which is at an analog level representative of the voltage on the base of transistor 132 when the latter voltage exceeds the voltage on the base of transistor 136 and, under the same conditions, to produce a voltage on line 158 which is a reference level. When the voltage on the base of transistor 132 is less than the voltage on the base of transistor 136, the output voltage on line 158 is to be at an analog level which is representative of the voltage on the base of transistor 132 and the voltage on line 157 is to be at a reference level.

For example, assume that the voltage on the base of transistor 132 is 5 volts and that this voltage is greater than the voltage on the base of transistor 136. In this case, the voltage on the base of transistor 144 would be equal to −3 volts, i.e., $[-(10-5)\times.6]$. The voltage on the base of transistor 146 would be −6 volts. In this state, the base of transistor 144 is more positive than the base of transistor 146. Thus, conduction through transistor 144 would increase, which would tend to diminish the current flowing through transistor 146. Part of the current flowing through transistor 144 would flow through transistor 147. The other part would flow through transistor 145$a$ and transistor 148 so that the current through transistor 148 would remain constant. There would be an effective decrease in the current in transistor 146 so that the voltage on the base of transistor 150 would attempt to go more positive. However, current flow through diode 146$b$ will change so as to hold the voltage at the base of transistor 150 at the reference level. Thus, where resistor 149$a$ and resistor 146$a$ are of the same value, the current flowing through resistor 150$a$ will remain fixed even though the current in transistor 146 is reduced. Current will flow through resistor 146$a$ and diode 146$b$ which is equal to the drop in current in transistor 146. The voltage on the base of transistor 150 will remain fixed and the voltage at the emitter thereof will be at the same positive value, as, for example, +11.5 volts.

Since the circuit for transistor 149 is the same as the transistor 150, the voltage on the base of transistor 149 normally will be at the same level as at the base of transistor 150. However, the change in the current flowing through transistor 144 will cause a change in the voltage on the base of transistor 149 so that the output at the emitter appearing on line 157 will be at a level dependent upon the magnitude of the signal on the base of transistor 144. The signal on line 157 will be at a value of +6.5 volts for a 5 volt signal applied to transistor 132. As the current through transistor 144 increases, the voltage on transistor 149 is lowered closer to ground with its emitter following.

When the 5 volt signal on transistor 132 is less than the signal on transistor 136, then the base of transistor 146 would be at ground potential. In this case, the base of transistor 146 is more positive than the base of transistor 144 so that there will be an effective change in the current flowing through transistor 146. This change will be reflected by a drop across resistor 150$a$ so that the voltage on the output line 158 will be other than at the reference level. The voltage on line 158 will be at +6.5 volts. By reason of operation of resistor 144$a$ and diode 144$b$, the current flow in resistor 149$a$ will remain unchanged. As a consequence, the voltage on transistor 149 will be unchanged and the voltage on line 157 will be at the reference level of +11.5 volts.

The foregoing example has been chosen to illustrate the manner in which a reference level voltage and the analog voltage can be produced on either of the output lines. In the embodiment of the circuit above described, the parameters set forth in Table I were employed.

Table I

Resistor 141$c$—10K
Resistor 142$a$—1.62K
Resistor 142$b$—5.11K
R.C. network 141$b$—820 ohms, 5 microfarads
Resistor 145$a$—3.01K
Resistors 144$a$, 146$a$, 149$a$, and 150$a$—5.11K
Resistors 149$b$ and 150$b$—1.78K
Resistors 147$a$ and 148$a$—3.24K
Resistor 148$b$—4.7K It will be noted that the signal applied to the base of transistor 146 is essentially of binary character, in that the voltage is either at ground potential or at −6 volts. In contrast, the signal at the base of transistor 144 is an analog signal, the signal being derived from the output of transistor 132 and having passed through transistor 142, whose gain is patterned for operation with amplifier 145. With the two inputs to the differential amplifier 145 of this character and with the feedback circuits 151 and 152, the operation of the circuit provides an output on lines 153 and 154 which is unique, with voltage on one line at a reference level and on the other line representative in a true analog sense of the amplitude of the cell output.

The array of transducers or cells in the retina 10 simultaneously provides a suite of signals, each of which varies between an upper limit representing the optical denisty of background areas and a lower limit representing image area. The amplitude correlator operates on the signal from each of the transducers to porduce a white output voltage and a black output voltage, where the white output voltage will be at a reference level if the transducer is in registration with an image area darker than the surrounding threshold area, and the black output voltage will be proportional to the transducer output.

The opposite is also true, in that the black output voltage will be at a reference level if the transducer is in registration with an image area lighter than the surrounding threshold area, and the white output voltage will be proportional to the transducer output.

Generally, the background areas may be found to be uniform and image areas will be uniform. Therefore, amplifier 134, 135 may operate at a point which will give a white output for all values which are significantly different than perfect image areas. Further, printing imperfections often lead to ambiguities. An area which should properly be classed as a background area, may appear darker than the background area due to a slight smudge. Similarly, one portion of an image area may be but slightly lighter than the rest of the image area.

In either case it is desirable to shift the decision toward white unless positive image area presence is sensed. For this purpose a diode **136*a* is included in FIGURE 3. Diode 136*a* is connected between the emitter of transistor 136 and the base of transistor 135. If the voltage on the base on transistor 132 is 10 volts and the voltage on the base of transistor 136 is 10.5 volts, it would be quite clear that the test cell properly might be identified as white. Because of the voltage drop across the diode 136*a*, the amplifier 134, 135 will provide such output indication because the voltage on the base of transistor 134 will exceed the voltage on the base of transistor 135**. Further, a clean up of character areas and background areas is effected where slight deviations from perfect character quality or perfect background quality are encountered.

Character masks

A plurality of pairs of character masks, one pair for each character to be identified, are provided at the outputs of the correlators. The output signals on lines 153 and 154 may be characterized as white signals and black signals, respectively. The signal on line 153 will be applied to the character mask 155, or the signal on line 154 will be applied to the character mask 156, but not both. The amplitude correlator 133 drives one input channel on mask 155 or on mask 156. The black mask 155 has one input channel connected to the white output channels of that fraction of the other two hundred and seven amplitude correlators, which for a perfect image of a given character should represent the output of a cell which should be in registration with a black image area. Similarly, the white mask 156 will be connected at the remainder of its input channels to the black output lines from all the other amplitude correlators which represent the output of a cell which, for a perfect image of a given character should be in registration with a white image area.

In the black mask, summing resistors are connected to the white output lines from those correlation channels where, for a perfect image, a black image area should register with a given cell. More particularly, if the signal from the given cell represents an image area darker than the average of its threshold area, then the essentially digital reference signal on the white output line of the amplitude correlator channel, is accepted in the black mask as a totally black signal. The assumption is made that the image area in registration with the given cell "matches" the mask. Thus, it is caused to contribute to the analog average of the mask output as if the cell were totally black. On the other hand, if the image area should be black but is lighter than its threshold area, then the analog signal appears on the white output line which is connected to the black mask. Any analog signal employed in any mask reflects the degree to which a given image area differs from its threshold area. The degree of cell mismatch is employed to contribute to the mask output in proportion to the degree of mismatch.

If a black image area registers with a given cell where black should be encountered in a perfect image of a given character, the reference voltage is applied to the channel for the given cell in the mask for that character. The same is true for white. The reference voltage may therefore be considered to be a digital representation in that the voltage on any correlator output line will be either at the reference level or at the analog level. Where a black image area registers with a given cell and where, for a perfect image of a given character, the area should be white (or where the opposite is true), then an analog voltage is applied to the channel for the given cell in the mask for that character. That is, the voltage applied to the mask is proportional to the cell output.

Additional pairs of character masks, represented by the unit 160, are included in the system. One pair of character masks is provided for each character to be recognized. The character masks 155, 156, and 160 may be of the type generally described in U. S. Patent No. 3,104,369 to Rabinow et al. However, in the present system, by use of both digital and analog information, a substantial improvement in reliability of character recognition is obtained.

The character mask for each character comprises two sets of predetermined resistor patterns. The pattern for one set is the inverse of the pattern for the other set. One represents areas which should be white and the other represents areas which should be black. The output voltages from the two sets are combined and the sum is applied by way of conductor 163 to output amplifier 161. Like amplifiers, represented by the unit 162, are provided for each of the other characters.

The connections between the outputs of the amplitude correlators and the character masks are selectively made to apply one output voltage from each correlator to one of each pair of masks, thereby to produce criteria output signals which are dependent upon the relative amounts of mismatch between a given image and the criterion built into each pair of masks.

While described above, the amplitude correlator may be considered as being formed of a first differential amplifier 134, 135 having a pair of input circuits for producing a binary signal of one state when the first input, such as on channel λ1, exceeds a second input as from the adding network 137. A second differential amplifier 145 has a signal from the first input transistor 132 applied to the first input of the amplifier 145 as at the base of transistor 144. The binary output signal from transistor 141 is applied to the second input of amplifier 145, as at the base of transistor 146. The feedback loops 151 and 152 serve to prevent one output of amplifier 145 from changing its output magnitude when the other output undergoes a change in magnitude.

Thus, an analog signal and a digital signal may appear on either of lines 157 or 158. When an analog signal appears on one line, a digital signal always appears on the other.

Output amplifier and dector

The output amplifier 161, FIGURE 4, serves to increase the level of signals from the output masks appearing on conductor 163. The amplifier delivers a signal, by way of conductor 164, to the character-presence detector 165 to detect the presence of information of a level adequate to indicate the presence of a character.

Amplifier 161 is provided with an input transistor 167, a control transistor 168, and an output transistor 169. A blanking circuit including a transistor 170 is provided to control the amplifier and, more specifically, to disable an amplifier upon application of disabling or blanking pulses to the input terminal 171.

The base of control transistor 168 is connected to a reference voltage circuit including transistors 173 and 174. A reference voltage is applied to the base of transistor 168. The reference level is selectable by adjustment of the resistor 175 in the emitter circuit of the transistor 176. The transistor 168 is thus biased to a reference level so that only that portion of the signal from the character masks which exceeds the reference level will be transmitted to the output transistor 169 of the amplifier 161.

In the system described, the resistor 175 is so adjusted in conjunction with the remainder of the elements in the amplifier circuit, that any voltage on conductor 163 at a level of between 10 volts and 11.5 volts will represent an acceptable match between a given character on the retina and the masks 155 and 156. In this case, the amplifier will produce a voltage at the output of transistor 169 which will vary between the limits of −8 volts and +7 volts for that portion of the input voltage which varies over the range of from 10 volts to 11.5 volts.

By adjustment of the resistor 175, for the voltage levels indicated, the voltage at the emitter of transistor 173 is set at about 11.8 volts and the voltage on the base of the transistor 168 is at about 10 volts. The signal applied to the base of the input transistor 167 causes the latter transistor to conduct continuously. However, only when the output from transistor 167 exceeds 10 volts will the transistor 168 conduct. When transistor 168 is cut off, the transistor 169 is conducting such that the voltage appearing at the emitter thereof will be held at about −7 volts. The latter voltage, applied to the base of transistor 186, produces an output voltage at the upper terminal of condenser 187 of −8 volts. However, when the transistor 168 conducts, the voltage at the output of transistor 169 and thus the voltage effective on condenser 187 may reach as high as +7 volts depending upon the signal level on the base of transistor 163.

Any such signal appearing at the emitter of transistor 169 is applied both to the base of transistor 186 and to the character-presence detector 165. A monotonic voltage generator, such as a staircase generator 180, is thus energized to apply to a staircase voltage by way of line 181 to a null detector circuit 185 which is in the output circuit of transistor 186. Transistor 186 applies a charge to a condenser 187. The charge on condenser 187 is proportional to the maximum amplitude of the voltage appearing at the output of transistor 169. When the stairstep voltage on line 181 is initiated, the voltage on condenser 187 will follow it in equal steps. The voltage on line 181 progressively increases until it reaches a point where the voltage on the base of transistor 189 causes transistor 189 to conduct.

Conduction in transistor 189 causes a change in the state of a flip-flop circuit 190. Circuit 190 has a pair of output transistors 191 and 192 which produce output states representing the "0" and "1" states of flip-flop 190. The transistors 191 and 192 thus supply an output signal on line 193 or 194, representative of the fact that a character corresponding with masks 155 and 156 has or has not been detected.

One null detector and flip-flop circuit is provided for each of the amplifiers in unit 162, the additional detectors and flip-flops being represented by the unit 195. While not shown, the output from the staircase generator is applied to all of the null detectors.

Any one of the null detectors in unit 195 may produce outputs such as on channel 196 and/or channel 197, and/or any of the additional channels (not shown). An error detector 199 is connected by way of channel **199*a* to the "1" output line 194. It is similarly connected wtih other mask output circuits. In response to plural outputs, an error detector 199** will inhibit the signal utilization by the computer. By this means, any ambiguity indicated by the presence of more than one detector output signal at any given time is avoided.

The error detector 199 will be connected to the outputs of all of the flip-flop circuits used in the system. The error detector may be of the type illustrated and described in U.S. Patent No. 3,160,855 to Holt.

When the first acceptable output is produced by flip-flop circuit 190, and when, for a predetermined number of steps of the staircase generator following the change of state of flip-flop circuit 190, no other flip-flop is actuated, then the computer 41 will not be inhibited. Rather, it will accept and utilize the one output voltage, as indicative of a given character having been recognized.

From the foregoing, it will be seen that there will be one storage condenser, such as the condenser 187, for each of the characters to be recognized. The voltages on all such condensers, where the input to the associated amplifier exceeds 10 volts, effectively will be compared with voltages on all of the other condensers having amplifier inputs exceeding 10 volts. By reason of progressive comparison by means of addition of the monotonic output from the staircase generator 180, the flip-flop circuit connected to the condenser whose voltage is at the highest level will be the first to be energized to produce a "1" output. The resulting character-identifying signal will be utilized if and only if no other output signal is generated from associated flip-flop circuits in two, three or more steps of the staircase generator after the first flip-flop has been fired. The number of such steps may be preset in the computer and may thus permit adjustment.

Since the clock 43 controls the staircase generator as indicated by line 200, and since the clock also controls the operation of the computer, the error detector 199 may be caused to apply reset pulses to lines 201 to reset the flip-flop circuit 190 and all like circuits. The reset pulse on channel 202 will reset the voltage on condenser 187 and, in like manner and through reset circuits such as the circuit 203, reset the voltages on all of the companion storage condensers.

As illustrated in FIGURE 4, an OR gate **41*a* is connected to line 194 on which a "1" output appears. Line 194 will be connected to corresponding lines from all the other flip-flops. The output of the OR gate 41*a* is applied to a gate 41*b* and to counters 41*c* and 41*d*. The clock 43 drives counters 41*c* and 41*d*. Counter 41*c* will be preset to apply a reset pulse to channel 202 after, for example, 48 counts, if the presence of no valid character has by that time been indicated. If, however, the presence of a valid character has been indicated prior to the end of the 48 counts and a first output signal is produced, as by the production of a "1" state on line 194, counter 41*c* will be reset by the output of OR gate 41*a* to start counting. The second count series will be preset to run for a predetermined number of clock pulses, for example two or three following the appearance of the first output signal. If no other output signal appears during the period of the counter 41*c*, then the computer 41 will utilize the single output condition and the counter 41*c* will apply reset pulses to channel 202. If the error detector 199 senses more than one output signal in the period of counter 41*c*, then a signal applied by way of gate 41*b* will cause the system to be reset and will inhibit computer 41** from utilization of any output signal when more than one output signal is present.

Thus, the generator 180 and the condenser 187 may be reset any time after instant of energization of generator 180 plus an interval dependent upon the period of counter **41*c*. Counter 41*d* may similarly be actuated to apply a flip-flop reset pulse to channel 201 at the same time as the reset pulse on channel 202. However, it has been found desirable for some operations to delay reset of the flip-flop unit 190** until after the entire voltage change program of the staircase generator has been completed. It could be produced at any later time provided that the flip-flop reset operation is completed prior to registration of the next succeeding character with the retina.

Vertical analyzer

While all signal channels such as the one above described continuously search for an amplifier output signal which singularly occurs at an amplitude above threshold, the vertical analyzer and the switch control illustrated in FIGURE 2 continuously monitor the output signals from all the cells in the retina 10, so that the output correlators will at all times be connected as to be centered on the mosaic or retina fraction on which a given image is centered. For this purpose, the output signals from all of the cells *a*1–*a*13, FIGURE 2, after passing through their respective video amplifiers, are applied to an OR gate 20. The output of the OR gate 20 is applied to a row analyzer 21*a* in row analyzer unit 21. Unit 21, together with the vertical analyzer unit 22, serves to sense the location of the top and the bottom of any image on the retina 10. More particularly, the row analyzer 21*a* will provide a binary output signal on the two output lines B and W. The top output line B will be energized to a "1" state if any one of the cells in row *a* sees a black image. The bottom output line W will be energized only if none of the cells in row *a* sees a black image.

Similar analyzers are provided for each of the rows of cells in the retina 10. Each of the row analyzers 21*a*–21*xx* has a similar pair of black and white output lines.

The output lines are shown extending horizontally from row analyzer unit 21 in FIGURE 1. The lines are selectively connected to a first set of vertical lines 210 leading to the top code unit 23 and to a second set of vertical output lines 212 leading to a bottom code unit 24. Each of the circles on lines 210 and 212 represents a diode interconnection of the type shown in FIGURES 6 and 7. More particularly, the first vertical line 210*a* is connected to the black horizontal line B leading from row analyzer 21*a*; to the white line leading from the analyzer for row *b*; and to the white line of the analyzer for row *c*. The signal on each of the lines 210 and 212 is inverted by inverters represented by units 215 and 216, respectively. Thus, the output signal on line 210*a* will be effective only if three conditions are satisfied, i.e., the output from the analyzer for row *a* is in a "not-black" state and the outputs from the analyzers for rows *b* and *c* are in a "not-white" state. The second line 210*b* is connected for not-black outputs from rows *a* and *b*, and not-white from rows *c* and *d*.

The analyzer operates to provide a signal, by way of a line in set 210, to the top code unit 23 if, and only if, two rows on which at least one cell of each such row sees black are immediately superposed by two rows wherein none of the cells sees black.

A different interconnection pattern is employed to sense the bottom of the character. To produce an effective output signal from set 212, the interconnections between the horizontal lines and the lines of set 212 require a black image to be present on at least one cell on one row with the three rows of cells immediately therebelow not in registration with any black image.

Further, as shown in FIGURE 1, an inhibit unit 50 is connected at its input to the output of the vertical analyzer. Unit 50 is connected at its output back to the vertical analyzer. The purpose of the inhibit unit is to make certain that the top recognized by unit 23 represents the top of the uppermost character on the retina at any given instant. It will be recognized that with a retina of the nature illustrated in FIGURE 1, the vertical analyzer 22 might produce output signals representing more than one top, since more than one character can be in registration with the retina 10. In order to make certain that the switches 14 follow only the topmost character on the retina, the output from each row analyzer channel which represents the top of a given character is coupled back to every channel therebelow so that the presence of a character top will inhibit the character top channels of all the lower rows. This is accomplished in accordance with a diode matrix, the nature of which is indicated in FIGURES 6 and 7. FIGURE 6 includes a portion of the vertical analyzer set 210. It will be noted that each vertical output line 210*b*, 210*c*, etc. is coupled by way of inverters 215*b*, 215*c*, etc. to output lines which lead to the code units. The output from inverter 215*b* representing a row *b* is connected by way of line 250 and a set of diodes 251 to all of the vertical lines other than line 210*a* (not shown) and line 210*b*. In a similar manner, the output from inverter 215*c* is connected by way of line 252 and a set of diodes 253 to all of the vertical lines other than lines 210*a*, 210*b* and 210*c*. Line 254 and a set of diodes 255 couple the output of inverter 215*d* to lines 210*e*, 210*f*, 210*g* . . . 210*ss* (not shown). By geometrical progression of a similar pattern of diode connections, a triangular matrix is formed in which all of the outputs will be inhibited except the output representing the top of the top image on retina 10. The general pattern of the matrix is illustrated by the shaded portion of the rectangle 256. In contrast, the diodes in the unit 210 form a diagonal pattern of cross coupling as represented by the shaded portion of rectangle 257. The circuit diagram of FIGURE 7 illustrates the inhibit action of the matrices of FIGURE 6. The four diodes connected to line 210*b* form an AND gate. For four inputs of +15 volts each, the output will be at 15 volts. The output of inverter 215*b* is zero volts. This condition is fed not only to the top code unit 23 but also, by way of diode 251*c*, to line 210*c*. Diode 251*c* is part of a five diode AND gate leading to line 210*c*. Similarly, line 210*d* will be inhibited by any higher top. The optics, in one embodiment of this system, were chosen such that the smallest character, a period, would be three cells high. Since the vertical analyzer requires at least one white row above a recognizable top, row *a* may never be used as a top. Note that, in FIGURE 2, a reference voltage source is provided above row analyzer 21*a* to provide the white input to the fourth diode of the AND gate leading to line 210*a*.

If all of the inputs of the AND gate leading to line 210*b* are satisfied, the zero output from inverter 215*b* will signify an image top in row *d*. This will then be translated, in accordance with known coding procedures in top code unit 23, to signify the location in digital form of the image top. The presence of a top represented by a zero voltage on the output of inverter 215*b* will inhibit all lower rows where the presence of a top might otherwise be signaled to top code unit 23. Similarly, the bottom code unit 24 will have input channels inhibited so that it will code only the bottom of the top image on the retina 10. Thus, a digital code is always present at the output of unit 23 representing the location in the retina 10 of the top of the top image. A digital code is always present at the output of unit 24 representative of the location of the bottom of the top image. In the unit 29, the code for the image bottom is subtracted from the code for the top to give a code representing the total height of the image. Following this, the code representing height is divided to one-half and the result is then subtracted from the code from the top unit 23. Thus, a control signal will be applied to the converter 30 which represents the location on the retina 10 of the center of the top image.

The triangular matrix 256 and the diagonal matrix 257 may be constructed in accordance with the fragmentary portions shown in FIGURE 6. In such case, every row below row *b* is inhibited. It will be recognized that there could be no second top detected in any closer than four rows below the row containing the top top. This is because the recognition of the top top requires at least two black rows and the recognition of the second top requires two white rows above two black rows. Thus, some of the diodes of FIGURE 6 can be eliminated so that a top in a given row will inhibit any top in the fourth row therebelow and in all rows lower than the fourth row.

Control lines 16c–16vv extend from the converter 30. Control unit 31b is connected only to line 16c. Control unit 31c is connected to lines 16c and 16d. Control unit 31d is connected to lines 16c, 16d, and 16e. Line 16c will be connected to control units 31b–31q. Line 16d will be connected to control units 31c–31r. Line 16e will be connected to control units 31d–31s. Line 16c will be energized when the code applied to the converter 30 represents the location of an image center on row c. Similarly, the lines 16d–16vv will be selectively energized in response to codes indicating an image center on other rows. Each of the control units serves to actuate a switching line to switch an entire row of thirteen video output signals onto thirteen decision channels.

The control 31b is shown in detail in FIGURE 2 and includes an input circuit 220 leading to the base of the transistor 221. The transistor 221 controls the potential on a switching line $\bar{b}$. Line $\bar{b}$ extends to the switch 130–1 for cell b1. It also is coupled to the switch 130–2 for cell b2. Thus, signals from cells b1 and b2 and from all additional channels leading from row b will be controlled in accordance with the state of the voltage on line $\bar{b}$. It is to be understood that other cell channels and their switches have been omitted from FIGURE 1 to avoid unnecessarily complicating the drawing. Further, for simplicity, only the control circuit 31b is illustrated in detail.

The control unit 31c, shown in block form, controls the potential on switching line $\bar{c}$ to energize switches 260–1, 260–2 . . . 260–13, thus controlling the application of signals from cells c1–c13 to output lines λ1–λ13. Unit 31d similarly controls the potential on line $\bar{d}$, thereby to control switches 261–1 . . . 261–13 which are in the channels carrying signals from cells in row d.

With switching provisions of this type for sets of outputs of forty-eight rows, taken sixteen at a time, the converter 30 maintains control such that the decision channels are centered on that portion of the retina on which a given image is centered.

In FIGURE 8 a portion of the switching matrix has been illustrated. Control lines 16c–16o are shown extending vertically from the top of FIGURE 8, each being connected to a diagonal control line. For example, line 16c is connected at point 270 to the diagonal control line 271. In a similar manner, the line 16d is connected to the diagonal 272, line 16e is connected to line 273, and so on, with all of the input lines 16c–16vv being connected to a diagonal line.

Vertical lines extending from the bottom terminals in FIGURE 8 serve to apply the same voltages to each of the sets of switches in a given column. For example, the set of switches 275 is the bottom set in a column of eight sets. The line 276 represents the thirteen output channels leading from the thirteen video amplifiers for cells b1–13. The set 275 includes thirteen switches. More particularly, it will include the switches 130–1 and 130–2, both illustrated in detail in FIGURE 2 and will further include the additional eleven switches which are not shown in FIGURE 2 but which are of the same construction as switches 130–1 and 130–2 and which are all energized from line $\bar{b}$. Thus, the thirteen video output signals appearing on the channels represented by line 276 will be applied to the output line 277 which represents decision channels λ1–13 which are shown in FIGURE 2. The thirteen switches in set 275 will be closed to apply the signals from the amplifiers for cells b1–13 to the output channels λ1–13 when the diagonal switching line 271 is energized. It will be noted that the channels represented by line 276 are connected to each of the remaining seven sets of switches in the column above set 275. Thus, when the switching line 272 is energized, the signals from the video amplifiers for cells b1–13 will be applied to the channels θ1–13 represented by the output line 278.

In summary, signals from all of the rows are connected into the switch matrix from the terminals at the bottom of FIGURE 8, the decision channels extend to the left side of FIGURE 8, and the output signals from the control unit 30 are applied to the switching matrix by way of the terminals at the top of FIGURE 8.

It will be noted that the first column of sets of switches is supplied by way of a line 280 on which a reference voltage appears. Such provisions are made so that when a small image is centered on row c, the equivalent of sixteen rows of signals will still be switched into the decision channels with the center of the decision channels (channels λ1–13) connected to row c and with reference voltages applied to the channels above row b. For example, when switching line 16c is energized, rows b–k will be switched to decision channels λ–Ψ and reference voltages from the first column of switch sets will be applied to output terminals α–θ. On the other hand, when switching line 16k is energized, rows b–r will be switched to decision channels α–Ψ and no reference voltages will be employed.

When switching line 16e, shown in dark outline, is energized, all of the sets of switches with darkened outlines will be actuated for application of signals to the decision channels.

It will be appreciated that only a portion of the switching system has been shown in FIGURE 8. In practice, the switching matrix will be extended to accommodate all of the rows b–ww. The opposite end of the switching matrix will be provided with reference voltages and reference switching sets for rows of cells at the lower end Ψ of the retina in the same pattern as provided in FIGURE 8 for the rows of cells at the top of the retina. By this means, reference voltages will be switched into the decision channels when a top character is centered within eight rows of cells to the bottom of the retina.

In the embodiment of the system above described, the clock 43 was an oscillator operating at 600 kc. as above noted. This system accommodated a document fed at a speed of two hundred inches per second. For this particular set of relationships, the functions illustrated in FIGURE 9 were involved. At this speed, characters spaced 0.083 inch apart on a given line being scanned would be brought into registration with the retina every four hundred and ten microseconds or at the rate of twenty-four hundred characters per second. The signal peaks 300 and 301, FIGURE 9, represent a signal as it would appear at the input to the amplifier 161, FIGURE 4, as a character corresponding with masks 155 and 156, FIGURE 3, crosses the retina.

It will be noted that the peak 300 is associated with two peaks 310 and 311 of relatively low amplitude. At the instant that any part of the peak exceeds a ten-volt level, the character-presence detector 165, FIGURE 4, will initiate a decision operation. The character-presence detector includes a delay network which will delay the firing pulse for the staircase generator 180 for a time interval of two hundred and forty microseconds. At the end of such delay, as represented by the function 304, the staircase generator 180 is actuated so that the output on line 181, FIGURE 4, follows the function 306, FIGURE 9, stepwise in forty-eight steps synchronized with the output from clock 43. By this means, one or more output signals will be produced for application to computer 41. During the time interval 307, the computer accepts an output signal unless inhibited by the error detector 199. The flip-flops in all decision channels of the system are then reset after an interval 307, which is required by the computer for utilization and at the latest, ahead of the time that the next character, represented by the peak 301, would be in registration with the retina.

The three peaks 300, 310 and 311, FIGURE 9, are produced for each output signal by operation of the jitter control unit 42, shown in FIGURE 1. The operation of the jitter control unit may be further understood by reference to FIGURE 2. In FIGURE 2, the code output from the center unit 29 is applied to the converter 30 by way of a gate 320. The jitter unit 42 and the gate 320 are periodically actuated by the output of counters 321 and 322. Both counters 321 and 322 are driven by a clock signal from the clock 43. Counter 321 provides an output pulse to the gate 320 every fifteen microseconds. By this means, the center code applied to converter 30 may be changed at fifteen-microsecond intervals. Counter 322 applies a signal to the jitter control unit 42 in synchronism with the signals from counter 321, but at five-microsecond intervals. The jitter intervals are illustrated in FIGURE 9, showing the peaks 300, 310 and 311 spaced at five-microsecond intervals.

If a given character image of height corresponding with sixteen rows of retina cells were precisely focused onto a sixteen-row mosaic with no overlap onto either row adjacent the bottom and top of the mosaic, then the signal represented by peaks 300, 310 and 311 would be characterized by the first peak 310 being maximum with the last two peaks being smaller. The first peak would be the output from the character mask, with the image center as computed by the center unit 29. The second peak would represent the mosaic shifted up one row of cells. The third peak would represent the mosaic shifted down one row of cells. By jittering in this manner, the output signals will be maximum on one of the three peaks, even though a given character may not be in precise registration with the sixteen-row mosaic indicated by the code from the center computer 29. This condition generally occurs in the operation of the system.

Row analysis may show that the image top in a row of cells extends into the row substantially less than one-half of a cell height. In this case, the third peak would be the highest of the three peaks. The jitter control unit 42 thus synchronously varies the code applied to the gate 30, adding one and subtracting one to the count at a five-microsecond rate.

The video amplifier described herein is described and claimed in copending application Ser. No. 462,004, filed June 7, 1965, of Daniel R. Hobaugh, entitled Video Amplifier with Asymmetric Gain Control and assigned to the assignee of the present invention.

The devoloping of a comparison voltage on an arithmetical basis for each cell with its surrounding cells as described herein is described and claimed in copending application Ser. No. 461,825, filed June 7, 1965, of Leonard J. Nunley, entitled Digital-Analog Retina Output Conditioning and assigned to the assignee of the present invention.

The detector and decision circuit described herein is described and claimed in copending application Ser. No. 461,721, now Patent No. 3,417,372, filed June 7, 1965, of Albert H. Bieser, entitled Character Identity Decision Generation and assigned to the assignee of the present invention.

Having described the invention in connection with certain specific embodiments thereof, it is to be understood that further modifications may now suggest themselves to those skilled in the art and it is intended to cover such modifications as fall within the scope of the appended claims.

What is claimed is:

1. In a character reader, the combination which comprises:

(a) a retina having a two-dimensional array of light-sensitive transducers across which successive character images move, said retina characterized by an array of height substantially exceeding the height of any of said images, (b) retina output channels, one of which extends from each of said transducers, (c) conditioning channels in number equal to the number of said transducers in a mosaic with which the tallest of said images will register in moving across said retina, (d) vertical analyzer means responsive to all of said output channels to maintain said conditioning channels coupled to the fraction of said retina output channels leading from said mosaic, (e) decision channels connected to the output of all of said conditioning channels, (f) means responsive only to the largest signal above a predetermined level in one of said decision channels for initiating search for a second largest signal in said decision channels, (g) utilization means connected to all of said conditioning channels, and (h) means responsive to the appearance of a second signal which exceeds a predetermined fraction of said largest signal to inhibit any signal transfer from said decision channels to said utilization means.

2. In a character reader, the combination which comprises:

(a) a retina having a two-dimensional array of light-sensitive transducers across which successive character images move, said retina being characterized by a transducer array of height which substantially exceeds the height of any of said images and is at least as wide as the width of any of said images, (b) retina output channels, one of which extends from each of said transducers, (c) conditioning channels in number equal to the number of said transducers in a retina mosaic with which the tallest of said images will register in moving across said retina, (d) an analyzer connected to all of said transducers for providing output signals indicative of registration of a part of an image with any cell in any row in said retina, (e) control input means connected to said analyzer to produce a first output code representing the row which registers with the top image top and to produce a second output code representing the row which registers with the top image bottom, (f) means connected to said analyzer and responsive to the output codes therefrom for producing an image center code, (g) switching means responsive to said image center code for connecting to said conditioning channels the mosaic of cells symmetrical to the image center row corresponding with said center code, (h) decision channels connected to the output of all of said conditioning channels, said decision channels being in number equal to the number of characters to be recognized, (i) means responsive only to the largest signal above a predetermined level in any one of said decision channels for initiating search for a second largest signal in said decision channels, (j) utilization means connected to all of said conditioning channels, and (k) means responsive to the appearance of a second signal which exceeds a predetermined fraction of said largest signal to inhibit any signal transfer from said decision channels to said utilization means.

3. A system having a plurality of conditioning channels for the recognition of images of printed characters which pass across cells forming a multi-row, multi-column retina which comprises:

(a) an analyzer connected to said cells for providing output signals indicative of whether any cell in any row is in registration with any part of an image, (b) control input means connected to said analyzer to produce an output code representing the row which registers with the top image top and to produce a code representing the cell row which registers with the top image bottom, (c) means for subtracting the image bottom code from the image top code to obtain an image height code, (d) means connected to said control input means and to the subtraction means for producing an image center code, (e) switching means connected to said cells and responsive to said image center code for connecting to said conditioning channels the mosaic of cells symmetrical to the image center row of cells corresponding with said center code, and (f) means for jittering said switching means to move said mosaic to one row above and to one row below said image center row to accommodate an image position in which only a portion of the height of a cell in an image top row or image bottom row is covered by an image.

4. In a character reader, the combination which comprises:

(a) a retina having a two-dimensional array of light-sensitive transducers across which successive character images move, said retina characterized by an array of height substantially exceeding the height of any of said images, (b) retina output channels, one of which extends from each of said transducers, (c) conditioning channels in number equal to the number of said transducers in a mosaic with which the tallest of said images will register in moving across said retina, (d) vertical analyzer means responsive to all of said output channels to maintain said conditioning channels coupled to the fraction of said retina output channels leading from said mosaic, (e) means in each said conditioning channel for generating a conditional signal which has a digital component and an analog component dependent upon the relative optical density and the absolute optical density, respectively, of the image area in registration with a given transducer, and (f) decision channels connected to the output of all of said conditioning channels for generating a character identifying signal.

5. A system having a plurality of conditioning channels for the recognition of images of printed characters which pass across cells forming a multi-row, multi-column retina which comprises:

(a) an analyzer connected to said cells for providing output signals indicative of registration of a part of an image with any cell in any row, (b) control input means actuated at sample intervals of the order of the period required for said image to move a distance equal to about one-half the distance between said cells and connected to said analyzer to produce a first output code representing the row which registers with the top image top and to produce a second output code representing the row which registers with the top image bottom, (c) computer means connected to said analyzer and responsive to the output codes therefrom for producing an image center code, and (d) switching means responsive to said image center code for connecting to said conditioning channels the mosaic of cells symmetrical to the image center row of cells corresponding with said center code.

6. A system having a plurality of conditioning channels for the recognition of images of printed characters which pass across cells forming a multi-row, multi-column retina which comprises:

(a) an analyzer connected to said cells for providing output signals indicative of registration of a part of an image with any cell in any row, (b) control input means actuated at sample intervals of the order of the period required for said image to move a distance equal to about one-half the distance between said cells and connected to said analyzer to produce a first output code representing the row which registers with the top image top and to produce a second output code representing the row which registers with the top image bottom, (c) computer means connected to said analyzer and responsive to the output codes therefrom for producing an image center code, (d) switching means responsive to said image center code for connecting to said conditioning channels the mosaic of cells symmetrical to the image center row of cells corresponding with said center code, and (e) means for modifying said image center code at jitter intervals equal to about one-third said sample interval to shift said mosaic up one row and down one row from the row corresponding with said image center code.

7. In a system for reading graphic characters from a printed document wherein moving images of said characters move across a sensing zone, the combination which comprises:

(a) a two-dimensional array of transducers of height exceeding the height of any of said images, each of said transducers including means for producing a varying electrical potential as incident light is varied by presentation of said images to said array, (b) a character identifying system including a plurality of conditioning channels in number less than the number of said transducers, (c) an analyzer connected to all of said transducers for providing output signals indicative of the position of the topmost of several images presented to said two-dimensional array of light sensitive transducers, (d) control input means connected to said analyzer to produce a first output code representing the row which registers with a top of the uppermost image and to produce a second output code representing the row which registers with the bottom of the uppermost image, (e) means connected to said control input means and responsive to the output codes therefrom for producing an image center code, and (f) switching means responsive to said image center code for connecting said conditioning channels to the fraction of said transducers in registration with the uppermost of said images as said images are presented to said array.

8. Image orientation apparatus including a plurality of conditioning channels in a system for the recognition of images of printed characters which pass across a two-dimensional array of light sensitive cells forming a multi-row, multi-column retina which comprises:

(a) an analyzer connected to said cells for providing output signals indicative of registration of a part of an image with any cell in any row, (b) control input means connected to said analyzer to produce a first output code representing the row of cells which registers with the top of the image passing across said retina when two upper rows of a set of four rows of said cells is in a "not black" state and two adjacent lower rows of cells are in a "not white" state, and to produce a second output code representing the row of cells which registers with the bottom of the image when an upper row of a set of four rows of said cells is in a ""black" state and three adjacent lower rows of cells are in a "white" state, (c) computer means connected to said control input means and responsive to the output codes therefrom for producing an image center code, and (d) switching means responsive to said image center code for connecting said conditioning channels to the mosaic of cells symmetrical with the image center row of cells corresponding with said center code.

9. A system including character identifying means having a plurality of conditioning channels for the recognition of images of printed characters which pass across light sensitive cells forming a multi-row, multi-column retina which comprises:

(a) an analyzer connected to said cells for providing output signals indicative of whether any cell in any row is in registration with any part of an image, (b) control input means connected to said analyzer to produce an output code representing the row which registers with the top of an image when two upper rows of a set of four rows of said cells is in a "not black" state and two adjacent lower rows of cells are in a "not white" state, and to produce a code representing the cell row which registers with the bottom of the image when an upper row of a set of four rows of said cells is in a "black" state and three adjacent lower rows of cells are in a "white" state, (c) means for subtracting the image bottom code from the image top code to obtain an image height code, (d) means connected to said control input means and to the subtraction means for producing an image center code, and (e) switching means connected to said light sensitive cells and responsive to said image center code for connecting said conditioning channel of the character identifying means the mosaic of cells symmetrical to a center image row of cells corresponding with said center code.

10. The combination set forth in claim 8 including gating means to render said switching means responsive to said image center code at periodic intervals which are small compared with the period required for an image to move across said retina.

11. The combination set forth in claim 8 including gating means to render said switching means responsive to said image center code at periodic intervals not greater than the time required for an image to move a distance equal to one-half the width of a cell in said retina.

12. The combination set forth in claim 8 including gating means to render said switching means responsive to said image center code at intervals not greater than the time required for an image to move a distance equal to one-half the width of a cell in said retina, and in which means are provided for jittering said switching means to move said mosaic to one row above and to one row below the image center during periods of one-third of each of said intervals to accommodate an image position in which only a portion of the height of a cell in an image top row or in an image bottom row is covered by an image.

References Cited

UNITED STATES PATENTS

| | | | |
|---|---|---|---|
| 3,069,079 | 12/1962 | Steinbuch et al. | 340—146.3 X |
| 3,140,466 | 7/1964 | Greanias et al. | 340—146.3 |
| 3,104,369 | 9/1963 | Rabinow et al. | 340—146.3 |
| 3,104,371 | 9/1963 | Holt | 340—146.3 |
| 3,104,372 | 9/1963 | Rabinow et al. | 340—146.3 |
| 3,201,751 | 8/1965 | Rabinow et al. | 340—146.3 |

MAYNARD R. WILBUR, Primary Examiner

L. H. BOUDREAU, Assistant Examiner

PO-1050
(5/69)

UNITED STATES PATENT OFFICE
CERTIFICATE OF CORRECTION

Patent No. 3,509,533 Dated April 28, 1970

Inventor(s) Albert H. Bieser, Leonard J. Nunley and Israel Sheinberg

It is certified that error appears in the above-identified patent and that said Letters Patent are hereby corrected as shown below:

Col. 9, line 14, "λ and 143" should be --λ1 and 143--.
Col. 11, line 4, "porduce" should be --produce--.
Col. 12, line 64, "dector" should be --detector--.
Col. 13, line 43, "to apply to a " should be --to apply a--;
line 70, "wtih" should be --with--.
Col. 19, line 42, "devoloping" should be --development--.
Col. 21, line 32, "conditional" should be --conditioned--.

SIGNED AND SEALED
SEP 22 1970

(SEAL)
Attest:

Edward M. Fletcher, Jr.
Attesting Officer

WILLIAM E. SCHUYLER, JR.
Commissioner of Patents